June 5, 1923.

A. W. POUGHER

DUPLEX LENS

Filed June 1, 1922

1,457,393

INVENTOR.
ARTHUR WILLIAM POUGHER
PER~
ATTORNEYS

Patented June 5, 1923.

1,457,393

UNITED STATES PATENT OFFICE.

ARTHUR WILLIAM POUGHER, OF MANCHESTER, ENGLAND.

DUPLEX LENS.

Application filed June 1, 1922. Serial No. 565,225.

*To all whom it may concern:*

Be it known that I, ARTHUR WILLIAM POUGHER, subject of the King of Great Britain and Ireland, residing at Copswood, Knutsford Avenue, Upper Chorlton Road, Manchester, in the county of Lancashire, England, have invented a new and useful Improved Duplex Lens, of which the following is a specification.

This invention relates to improved means for preventing dazzle in connection with the lamps of motor and other vehicles and has for its object an improved construction of lenses whereby the dazzle or glare is eliminated without reducing the light value.

According to the invention, I employ a double or duplex lens, consisting of two distinct lenses, and each of the lenses is formed of prisms of different diverging angles. The lenses are suitably spaced apart and are located in front of the source of light or the reflector. The rear lens, that is the lens nearest the source of light, and hereinafter referred to as the receiving lens splits up the light rays projected from the source of light, or from the reflector used in conjunction therewith, whilst the front lens hereinafter referred to as the projecting lens, acts to further break up the light rays received from the back lens.

The prismatic lenses are so arranged that the actual light rays or beams emitted from the front lens, or what may be termed the strong rays, is contained within an angle of 20 degrees, whilst the light rays outside this angle consist of what may be termed weak or split up rays. Consequently when two vehicles approach one another from a distance the strong rays of one vehicle will be visible to the other, but as the vehicles get closer together, each is cut off from the strong rays of the other, and thus neither suffers from the dazzling effect of the other's lamps.

In order that the invention may be readily understood reference is made to the accompanying drawings which show more or less diagrammatically the preferred method of carrying the same into effect.

Figure 1:
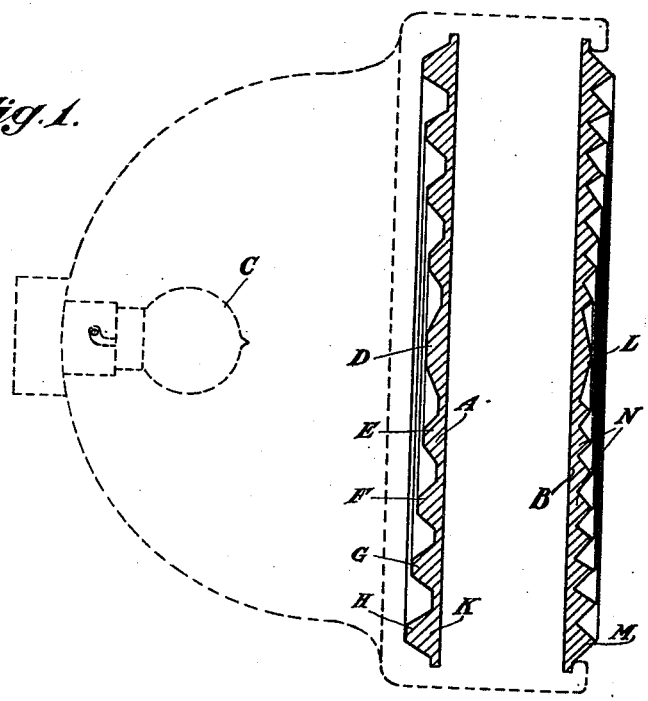
Figure 1 is a sectional view of the two prismatic lenses as they would be arranged in the lamp.

In Figure 1 the back or receiving lens is indicated at A, the front or projecting lens at B and the source of light which may consist of a lamp proper or a reflector at C.

Each of the lenses is of the plano-concave type with their concave faces outwardly, the concave face of the lens A being towards the source of light and the concave face of the lens B being towards the illuminated objective. The receiving lens A is built up of a series of symmetrical concentric prisms, the centre prism D being of greater cross sectional area than that of the prisms E, F, G, H and the angular faces of the prisms E to H are of successively greater length and are struck from a common base line lying parallel with the plane face K of the lens.

The faces of the centre prisms D as represented in Fig. 1 are at an angle of from 60 to 63 degrees with relation to the principal or central axis of the lens, whilst the faces of the prisms E to F are arranged at or about 32 degrees from the principal or central axis of the lens. With the lamp C positioned substantially in the relationship illustrated by Fig. 1, I find that the incident rays of the prism D are converted into substantially parallel emergent rays, whilst the incident rays of the remaining prisms are split up irregularly or diffused.

The front or projecting lens B has a centre prism L the angular faces of which are arranged at an angle of about 65 to 66 degrees to the principal axis of the lens, whilst the outermost prism M has its angular face arranged at an angle of approximately 40 degrees to such axis, the faces of the intermediate prisms N N being all at or about 48 degrees. The outer face of the prism M may be frosted. The prisms L, M, N are all symmetrical and concentric, and I find that by forming them at the angles specified that the substantially parallel incident beams of light of the central prism L from the prism D are converted into divergent emerging beams, whilst the split up or irregular incident beams of the prisms M, N are still further split up, whereby the beam of light emitted by the lamp outside the central beam from the prism L is relatively weak.

The outer faces of the lenses may if desired be plane surfaces instead of concave, but I prefer to employ lenses having the prisms forming a concave surface so that the dark centre spot in lenses as at present constructed is eliminated.

Figure 2:
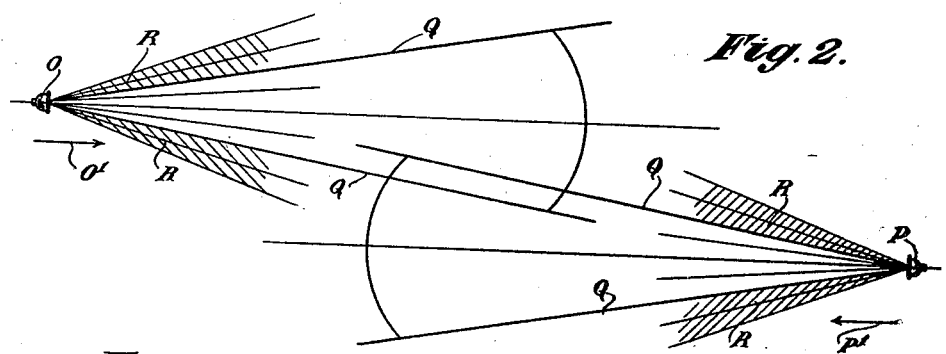
Figures 2 and 3 are diagrams showing the rays of light from the lamps of two approaching vehicles, Figure 2 showing the two vehicles some distance apart, and Figure 3 a similar view when the vehicles are about to pass one another.
Figure 3:
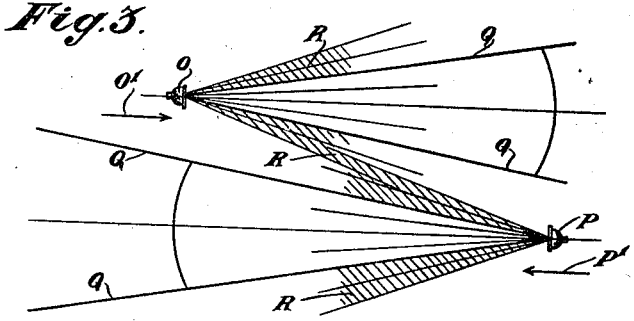

Referring now to the diagrams shown in Figures 2 and 3, O represents the inner lamp of a vehicle travelling in the direction of the arrow $O^1$ and P the lamp of an adjacent vehicle travelling in the direction of the arrow $P^1$.

As will be seen from the diagrams, either vehicle will only be within the angle of the strong rays indicated by the lines Q Q when said vehicles are a comparatively long distance from the other, and as the vehicles approach one another as seen in the diagram in Figure 2 each vehicle passes out of the range of the strong rays of the other some distance before the moment of passing. The strong rays Q are confined within an angle approximately 20 degrees that is a cone of light rays is produced having an angle of 10 degrees with its central axis. All light rays outside this cone of light constitute what may be termed weak or split up rays and are indicated by the sectioned lines at R R.

I claim:—

1. Means for preventing dazzle in lamps in which a pair of lenses are employed, such lenses having prisms formed thereon, characterized in that the lenses are spaced apart and the prisms formed thereon comprise a plurality of concentric prisms the two innermost and opposite prisms being so shaped that rays of light passing therethrough from the source of light do not intersect and are emitted divergently from the prisms furthest from the source of light, whilst the remaining prisms are so shaped that the rays of light emanating from the source of light are directed from such latter prisms in such directions that they intersect and are diffused, whereby the light emitted from the lamp comprises two concentric beams of light, the inner being stronger than the outer for the purpose specified.

2. Means for preventing dazzle or glare in vehicle lamps, comprising two spaced lenses located between a source of light and an objective, one of said lenses constituting the receiving lens having its face located towards the source of light formed of a plurality of concentric prisms, whilst the other lens has its face located towards the objective formed of a plurality of concentric prisms, the two innermost and opposite prisms being plano-convex and serving to emit non-intersecting rays of light, whilst the remaining prisms are so shaped and located as to direct the rays of light emanating from the source of light in such manner that they intersect whereby they emit diffused light, so that the light emitted from the lamp comprises two concentric beams of light, the inner being stronger than the outer for the purpose specified.

3. Means for preventing dazzle or glare in vehicle lamps, comprising a rear lens having its face located towards a source of light formed of a plurality of concentric and symmetrical prisms and its opposite face plane, and a second lens located in front of the rear lens having its face located towards the source of light formed plane and its opposite face formed of concentric symmetrical prisms, the prisms of one lens being of different diverging angle to the prisms of the other lens, the two innermost and opposite prisms being so shaped and located so as to emit a strong beam of non-diffused light, whilst the remaining prisms are so shaped and located as to emit diffused light, whereby the light emitted from the lamp comprises two concentric beams of light, the inner being stronger than the outer for the purpose specified.

ARTHUR WILLIAM POUGHER.